(12) United States Patent
Takeshita et al.

(10) Patent No.: US 7,986,606 B2
(45) Date of Patent: Jul. 26, 2011

(54) OPTICAL HEAD DEVICE

(75) Inventors: Nobuhiko Takeshita, Koriyama (JP);
Tomoki Gunjima, Koriyama (JP); Kara Yoshida, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 1010 days.

(21) Appl. No.: 11/686,131

(22) Filed: Mar. 14, 2007

(65) Prior Publication Data
US 2007/0159932 A1      Jul. 12, 2007

Related U.S. Application Data

(63) Continuation of application No. PCT/JP2005/016851, filed on Sep. 13, 2005.

(30) Foreign Application Priority Data

Sep. 14, 2004   (JP) ................................. 2004-266728

(51) Int. Cl.
*G11B 7/00*   (2006.01)
(52) U.S. Cl. ............ 369/112.16; 369/112.19; 369/13.31
(58) Field of Classification Search ............. 369/112.18, 369/112.1, 112.16, 112.27, 112.01, 13.31, 369/13.29, 13.3, 110.01, 110.02, 110.03, 369/110.04
See application file for complete search history.

(56) References Cited

U.S. PATENT DOCUMENTS

| | | | | |
|---|---|---|---|---|
| 6,565,974 B1 * | 5/2003 | Uchiyama et al. | ............ | 428/412 |
| 6,580,674 B1 * | 6/2003 | Nishiyama et al. | ...... | 369/112.16 |
| 7,050,380 B2 * | 5/2006 | Hirai et al. | ............... | 369/112.17 |
| 2002/0005925 A1 * | 1/2002 | Arakawa | ....................... | 349/117 |

FOREIGN PATENT DOCUMENTS

| | | |
|---|---|---|
| JP | 10-68816 | 3/1998 |
| JP | 2001-004841 A | 1/2001 |
| JP | 2001-101700 A | 4/2001 |
| JP | 2002-156528 A | 5/2002 |
| JP | 2003-098350 A | 4/2003 |
| JP | 2003-329840 A | 11/2003 |
| JP | 2004-158118 A | 6/2004 |

* cited by examiner

*Primary Examiner* — Tan X Dinh
(74) *Attorney, Agent, or Firm* — Oblon, Spivak, McClelland, Maier & Neustadt, L.L.P.

(57) ABSTRACT

An optical head device having a broadband phase plate of transforming at least three linearly polarized light beams having different wavelengths into circularly polarized light beams, is obtained.

A broadband phase plate comprising two phase plates 9A and 9B laminated with e.g. an adhesive agent so that their optical axes are crossed, wherein provided that wavelengths of linearly polarized incident light beams are $\lambda_1$, $\lambda_2$ and $\lambda_3$ ($\lambda_1<\lambda_2<\lambda_3$), at least one or both of the two phase plates has such a phase difference characteristics that a ratio $\langle R(\lambda_1)/R(\lambda_3)\rangle$ and a ratio $\langle R(\lambda_2)/R(\lambda_3)\rangle$ between retardation values of the wavelengths are smaller than 1 and $\langle R(\lambda_1)/R(\lambda_3)\rangle$ is smaller than $\langle R(\lambda_2)/R(\lambda_3)\rangle$, is integrated in the optical head device.

23 Claims, 9 Drawing Sheets

OPTICAL HEAD DEVICE

TECHNICAL FIELD

The present invention relates to an optical head device employing a broadband phase plate for controlling phase state of laser beam.

BACKGROUND ART

An optical head device is employed for writing an optical information to or reading an optical information from an optical recording medium such as an optical disk or an optical magnetic disk. In such an optical head device, emission light from a laser diode as a light source, is converged by an objective lens on a recording plane of a disk-shaped optical recording medium (hereinafter referred to as "optical disk"), to carry out writing and/or reading of an information. At a time of e.g. reading an information, emission light reflected by an information recording plane of an optical disk is received by a photodetector.

By the way, with respect to read-out of information, the shorter the wavelength of laser beam in use is, the more the recording density can be increased, and thus, use of emission light of shorter wavelength (405 nm) from a light source, for an optical head device, has been in progress in recent years. Meanwhile, such an optical head device is, at the same time, required to be capable of reading with laser beam of longer wavelengths (660 nm and 790 nm) for many optical disks that have been widely used. For this purpose, e.g. JP-A-2004-158118 proposes various types of optical head devices using laser beams of conventional longer wavelengths and laser beams of shorter wavelengths to realize compatibility of optical disks.

With respect to writing of information, in order to obtain this compatibility with conventional optical disks, a type of optical head device has been considered, which employs light sources of longer wavelengths in addition to a light source of shorter wavelength for high-density recording. Meanwhile, in order to realize an optical head device capable of handling high-density optical disks and writable type optical disks such as DVD-Rs or CD-Rs, high light-utilization rate is required for each wavelength for each type of optical disk.

For this reason, a polarization type optical head device has been considered, which employs a polarizing diffraction element having high transmittances for outgoing path and high diffraction efficiency for returning path. Here, "outgoing path" means a direction of emission light from a light source to an optical disk and "returning path" means a direction of emission light reflected by an information recording plane of an optical disk towards a photodetector, namely, a direction in which reflected and returned light propagates.

FIG. 14 shows an example of the construction of an optical head device having a polarizing optical system employing conventional three different laser beams, namely, three types of laser beams.

In FIG. 14, linearly polarized laser beams from a laser diode 101A emitting wavelength of 405 nm, a laser diode 101B of 660 nm and a laser diode 101C of 790 nm, are transmitted through a polarizing hologram 102A for 405 nm, a polarizing hologram 102B for 660 nm and a polarizing hologram 102C for 790 nm, respectively, that have high transmittance for linearly polarized incident light. Then, these linearly polarized laser beams are transformed into circularly polarized laser beams by a quarter wavelength plate 103A for 405 nm, a quarter wavelength plate 103B for 660 nm and a quarter wavelength plate 103C for 790 nm, respectively, that are each integrally formed with a polarizing hologram.

Thereafter, the laser beams are transformed into parallel beams by a collimator lens 104A, a collimator lens 104B and a collimator lens 104C that are disposed separately, transmitted through or reflected by a beam splitter 105 having a characteristic of transmitting 405 nm and reflecting 660 nm, and further, transmitted through or reflected by a beam splitter 106 having a characteristic of transmitting 405 nm and 660 nm and reflecting 790 nm. Then, these laser beams are converged on an information recording plane (hereinafter simply referred to as "surface of optical disk") of an optical disk D by an objective lens 108 common to three wavelengths, which is held by an actuator 107.

Further, the reflected light beams from an optical disk D containing information of pits formed on a surface of the optical disk, propagate inversely through the respective paths. Namely, circularly polarized light beams whose rotation directions are inverted by reflection at the surface of the optical disk D, are transmitted again through the quarter wavelength plate 103A, the quarter wavelength plate 103B and the quarter wavelength plate 103C, respectively, to be transformed is into linearly polarized light beams having polarization directions perpendicular to the respective incident polarization directions, and diffracted by the polarizing hologram 102A, the polarizing hologram 102B and the polarizing hologram 102C to be diffracted light beams. Information of pits of the optical disk D included in these diffracted light beams, are detected by a photodiode 109A as a photodetector for 405 nm, a photodiode 109B for 660 nm and a photodiode 109C for 709 nm, to read out information recorded on the surface of the optical disk D.

In a conventional optical head device using a plurality of wavelength regions such as 405 nm, 660 nm and 790 nm, it is proposed to use common optical elements such as a quarter wavelength plate (for example, refer to JP-A-10-68816). However, a phase plate (quarter wavelength plate) for converting linearly polarized light beams of two wavelengths such as wavelengths 405 nm and 660 nm, to circularly polarized light beams, cannot convert a linearly polarized light beam of wavelength 790 nm to a complete circularly polarized light beam. In the same manner, a phase plate for converting linearly polarized light beams of wavelengths 660 nm and 790 nm to circularly polarized light beams, cannot convert a linearly polarized light beam of 405 nm to a complete circularly polarized light beam, and thus, desired characteristics cannot be obtained.

Further, JP-A-2002-156528 describes that a broadband phase plate can be constituted by a single phase plate without laminating phase plates. The broadband phase plate is designed so that its retardation value reduces as the wavelength value becomes shorter. However, in order to obtain a function of complete quarter wavelength plate in entire region of wavelength from 400 to 780 nm by using the single broadband phase plate, design of the material is extremely difficult and such a broadband phase plate is not satisfactory for high-recording-density use which requires high-light-utilization efficiency.

Further, hereinafter, in an optical head device to be used for an optical recording medium for which higher light-utilization efficiency is required such as a Blu-Ray Disk that is expected to be a next-generation standard which uses a light source of further shorter wavelength, optical elements such as the above-mentioned quarter wavelength plate do not have sufficient characteristics. For example, in an optical head device using three wavelengths 405 nm, 660 nm and 790 nm, it is necessary to dispose total three sets of optical elements that are optical elements for 405 nm, optical elements for 660 nm and optical element for 790 nm, which causes problems that the number of components is increased to increase the volume of the device and that it takes longer time for assembly and adjustment.

Meanwhile, in order to downsize an optical head device, it is proposed to dispose two laser diodes closely or to employ a laser diode capable of emitting a plurality of wavelengths. However, in these cases, it is difficult to switch optical paths for respective wavelengths even by using a beam splitter having different reflectivities at different wavelengths. Thus, it is desired to use optical elements common to these wavelengths.

DISCLOSURE OF THE INVENTION

Problems to be Solved by the Invention

The present invention has been made under the above-mentioned circumstances, and it is an object of the present invention to provide an optical head device using at least three laser beams of different wavelengths as light sources, which employs optical components common to the wavelengths to reduce the number of components and to shorten time for assembly, which is small sized, and which can reduce a cost.

Means for Solving the Problems

The present invention has the following gists.

1. An optical head device comprising a light source for emitting a linearly polarized laser beam, an objective lens for converging the laser beam to guide it to an optical recording medium, and a photodetector for receiving light reflected by the optical recording medium, wherein the laser beam is any one of three or more laser beams having different wavelengths, a broadband phase plate for controlling phase state of the laser beam is disposed between the light source and the objective lens, the broadband phase plate is constituted by two phase plates laminated so that their optical axes are crossed, and when the three laser beams have wavelengths $\lambda_1$, $\lambda_2$ and $\lambda_3$ ($\lambda_1 < \lambda_2 < \lambda_3$) respectively, at least one of the phase plates has such retardation values that proportions $\langle R(\lambda_1)/R(\lambda_3) \rangle$ and $\langle R(\lambda_2)/R(\lambda_3) \rangle$ between retardation values $R(\lambda)$ at the wavelengths, satisfy the following formulas:

$$\langle R(\lambda_1)/R(\lambda_3) \rangle < 1,$$

$$\langle R(\lambda_2)/R(\lambda_3) \rangle < 1, \text{ and}$$

$$\langle R(\lambda_1)/R(\lambda_3) \rangle < \langle R(\lambda_2)/R(\lambda_3) \rangle.$$

2. The optical head device according to the above 1, wherein the laser beam has any one of wavelengths $\lambda_1$, $\lambda_2$ and $\lambda_3$, and said at least one of the phase plates has retardation values satisfying the following relations:

the value of the proportion $\langle R(\lambda_1)/R(\lambda_3) \rangle$ between the retardation values $R(\lambda_3)$ and $R(\lambda_1)$ is larger than the ratio of wavelengths ($\lambda_1/\lambda_3$), the ratio $\langle R(\lambda_2)/R(\lambda_3) \rangle$ between the retardation values $R(\lambda_3)$ and $R(\lambda_2)$ is larger than the value of wavelengths ($\lambda_2/\lambda_3$) and the ratio $\langle R(\lambda_1)/R(\lambda_2) \rangle$ between the retardation values $R(\lambda_2)$ and $R(\lambda_1)$ is larger than the ratio of wavelengths ($\lambda_1/\lambda_2$).

3. The optical head device according to the above 1 or 2, wherein among the two phase plates, the retardation value of the phase plate into which the laser beam is incident firstly is larger than the retardation value of the phase plate into which the laser beam is incident secondly, and the ratio of the two retardation values is from 1.8 to 2.2.

4. The optical head device according to any one of the above 1 to 3, wherein the crossing angle of the optical axes of the two phase plates is within a range of from 40 to 70°.

5. The optical head device according to any one of the above 1 to 4, wherein the broadband phase plate has substantially the same ellipticities in the three wavelength regions where the laser beams of three wavelengths are transmitted.

6. The optical head device according to any one of the above 1 to 5, wherein the two phase plates are laminated via an adhesive layer and the thickness of the adhesive layer is at most 10 μm.

7. The optical head device according to any one of the above 1 to 6, wherein the two phase plates are employed as they are bonded to at least one transparent substrate.

8. An optical head device according to any one of the above 1 to 7, wherein the broadband phase plate is integrated with at least one optical element for changing optical characteristics of the laser beam.

Effects of the Invention

According to the present invention, differently from conventional optical head devices, a phase plate having a retardation value which decreases as the wavelength becomes shorter, is employed for at least one of two broadband phase plates laminated together. The phase plate substantially functions as a quarter wavelength plate for at least three linearly polarized laser beams having different wavelengths transmitted, and transforms the linearly polarized laser beams into circularly polarized laser beams. This feature enables to make an optical element common to the wavelengths to reduce the number of components, and realizes an optical head device requiring shorter assembly time, which is small sized and low cost.

Figure 1:
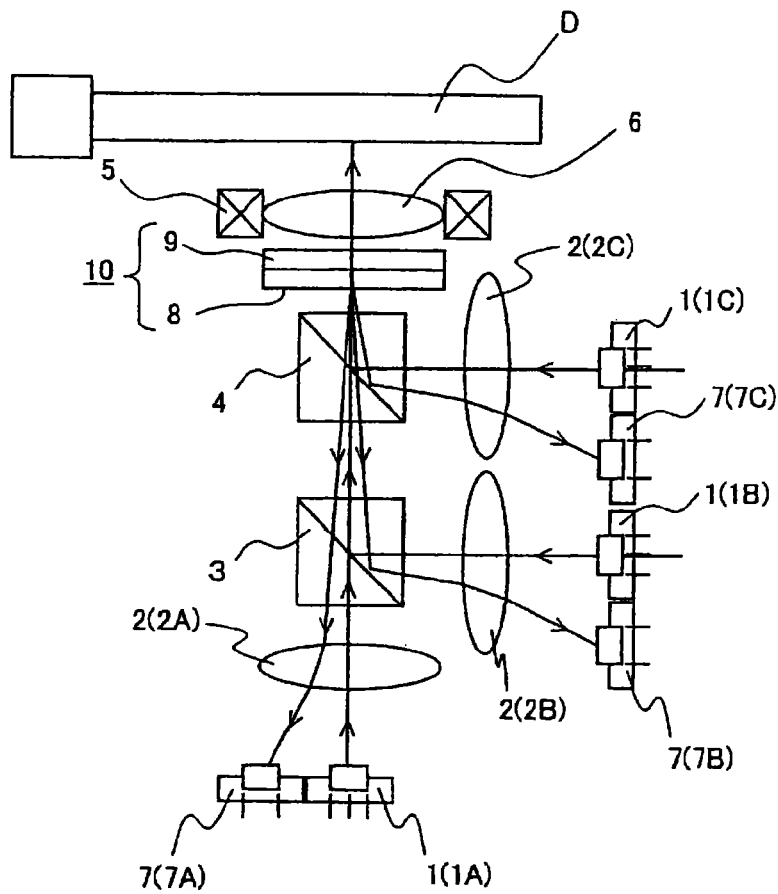
FIG. 1: A construction view showing an optical head device according to an embodiment of the present invention.

EXPLANATION OF NUMERALS 1A, 1B, 1C: laser diode
2, 2A, 2B, 2C: collimator lens
3, 4: beam splitter
5: actuator
6: objective lens
7, 7A, 7B, 7C: photodiode
8: polarizing hologram
9: quarter wavelength plate
9A: first phase plate
9B: second phase plate
90: broadband phase plate
91: low reflective coating film
92: glass substrate
93: polyimide alignment film
94, 95: polymer liquid crystal thin film
96: adhesive layer
10: broadband optical element
D: disk

BEST MODE FOR CARRYING OUT THE INVENTION

Embodiments of the present invention are described in detail below with reference to attached drawings.

FIG. 1 shows an optical head device according to an embodiment of the present invention, and the optical head device comprises a light source 1, collimator lenses 2A to 2C, first and second beam splitters 3 and 4, an actuator 5, an objective lens 6 held by the actuator 5 and common to three wavelengths, a photodetector 7, and further, a broadband optical element 10 constituted by a polarizing hologram 8 and a quarter waveplate 9 (that has a construction of broadband phase plate for controlling phase states of three types of laser beams) that are integrated together, the broadband optical element 10 being disposed between the light source 1 and the objective lens 6.

In this embodiment, the light source 1 is constituted by laser diodes 1A, 1B and 1C for emitting three types of laser beams having different wavelengths. Further, the photodetector 7 employs first to third photodiodes 7A to 7C corresponding to wavelengths of the laser beams.

Meanwhile, the polarizing hologram 8 and the quarter wavelength plate 9 are integrally formed, and they are attached substantially horizontally to the objective lens 6 held by the actuator 5. Here, the quarter wavelength plate 9 to be used is a broadband phase plate 90 according to the present invention. The broadband phase plate 90 has a construction that two phase plates are integrally laminated so that their optical axes are crossed. Particularly, the broadband phase plate 90 of this embodiment has a characteristic that when a laser beam has wavelengths $\lambda_1$, $\lambda_2$ and $\lambda_3$ ($\lambda_1 < \lambda_2 < \lambda_3$), at least one of the phase plates has retardation values the ratios between which, namely, the ratios $R(\lambda_1)$, $R(\lambda_2)$ and $R(\lambda_3)$ satisfy the following formula:

$$(R(\lambda_1)/R(\lambda_3))<1.0,$$

$$(R(\lambda_2)/R(\lambda_3))<1.0,$$

$$(R(\lambda_1)/R(\lambda_3))<(R(\lambda_2)/R(\lambda_3)) \tag{1}$$

Provided that the retardation values at the respective wavelengths satisfy a relational formula $R(\lambda_1)<R(\lambda_2)<R(\lambda_3)$, formula (2) obtained by dividing the relational formula by $R(\lambda_3)$, and formula (1) is easily obtained from formula (2). Here, $0<R(\lambda_3)$ is satisfied.

$$R(\lambda_1)/R(\lambda_3)<R(\lambda_2)/R(\lambda_3)<1.0 \tag{2}$$

Accordingly, satisfying formula (1) means that as the wavelength increases from $\lambda_1$, $\lambda_2$ to $\lambda_3$, the retardation value increases from $R(\lambda_1)$, $R(\lambda_2)$ to $R(\lambda_3)$ in this order.

Here, a broadband phase plate can be obtained, in which phase difference produced by the phase increases as the wavelength increase, and the longer the wavelength is, the larger the phase difference becomes.

By such a characteristic, the broadband phase plate 90 functions substantially as a quarter wavelength plate for linearly polarized laser beam of any wavelength transmitted, which can transform linearly polarized light into substantially circularly polarized light.

Generally speaking, a birefringent material to be used for such a broadband phase plate has a wavelength dependence (hereinafter referred to as "ordinary dispersion property") in which retardation value increases as wavelength becomes shorter such as a polycarbonate film provided with birefringency by e.g. drawing, but a birefringent material to be employed in the present invention has a characteristic (hereinafter referred to as "extraordinary dispersion property") in which retardation value decreases as wavelength becomes shorter.

As birefringent materials having this extraordinary dispersion property, for example, the following materials are mentioned, but the phase plate material of the present invention is not limited to these materials so long as the material has extraordinary dispersion property.

(1) A film formed by drawing a copolymer and/or a blend of such polymers containing monomer units of a polymer having a positive birefringent index (birefringent index: Δn=extraordinary refractive index−ordinary refractive index) and monomer units of a polymer having a negative birefringent index (refer to JP-A-2002-156528), (2) a phase difference film having a liquid crystal layer containing a compound having at least two types of mesogen group and a rod-like liquid crystal compound, in which the rod-like liquid crystal compound has a homogeneous alignment, and at least one type of mesogen group in the compound having mesogen groups is aligned in a film plane at an angle of from 45° to 90° to the optical axis of the rod-like liquid crystal compound (refer to JP-A-2002-267838), and (3) a film of a polymer liquid crystal formed by polymerizing a polymerizable liquid crystal composition containing at least one type of compound selected from the polymerizable compounds (A) below or at least one type of compound selected form the polymerizable compounds (B) below, or a film of a polymer liquid crystal formed by polymerizing a polymerizable liquid crystal composition containing at least one type of the polymerizable compounds (A) below and at least one type of polymerizable compounds (B) below (refer to JP-A-2005-115886).

$$CH_2=CR^1—COO-J^1-(E^1-J^2)_n-W^1-J^3-M-R^2 \quad (A)$$

$$CH_2=CR^3—COO-J^4-E^2-COO—W^2—OCO-E^3-J^5-OCO—CR^3=CH_2 \quad (B)$$

(here, signs $R^1$, $R^2$, $R^3$, n, $J^1$, $J^2$, $J^3$, $J^4$, $J^5$, $E^1$, $E^2$, $E^3$, $W^1$, $W^2$ and M represent the following items.)

$R^1$, $R^3$: Each independently a hydrogen atom or a methyl group.

$R^2$: a $C_{2-8}$ alkyl group.

n: 0 or 1.

$J^1$: a single bond, $—(CH_2)_a—$ or $—(CH_2)_bO—$ (here, a and b are each independently an integer of from 2 to 8.).

$J^2$, $J^3$: Each independently a single bond, —OCO— or —COO—.

$J^4$: $—(CH_2)_tO—$ or $—(CH_2)_uO—CO—$ (wherein t and u are each independently an integer of from 2 to 6.).

$J^5$: $—O(CH_2)_c—$ or $—COO—(CH_2)_d—$ (wherein c and d are each independently an integer of from 2 to 6.).

$E^1$, $E^2$, $E^3$: Each independently a 1,4-phenylene group or a trans-1,4-cyclohexylene group. Here, hydrogen atoms in these groups may be substituted by chlorine atoms, fluorine atoms, methyl groups or cyano groups.

$W^1$, $W^2$: Each independently a naphthalene-1,4-diyl group, a naphthalene-1,5-diyl group, an anthracene-1,4-diyl group, an anthracene-1,5-diyl group, an anthracene-1,10-diyl group, an anthracene-4,9-diyl group, an anthracene-5,9-diyl group or an anthracene-9,10-diyl group. Here, hydrogen atoms in these groups may be substituted by chlorine atoms, fluorine atoms, methyl groups or cyano groups.

M: Any one of the groups represented by the following formulas (a) to (f).

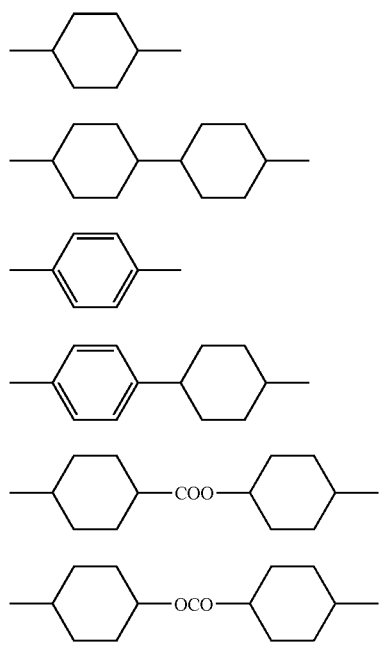

As such a material, the following compounds may, for example, be mentioned.

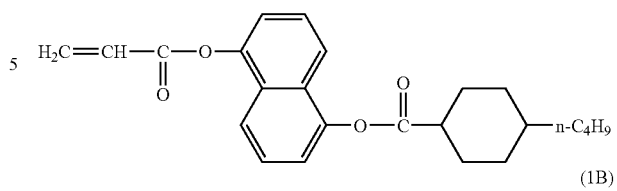
(1A)

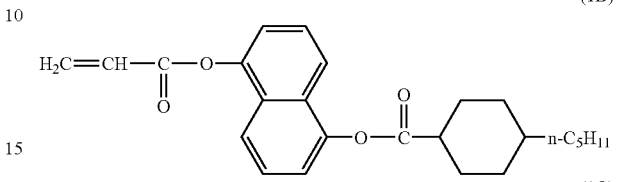
(1B)

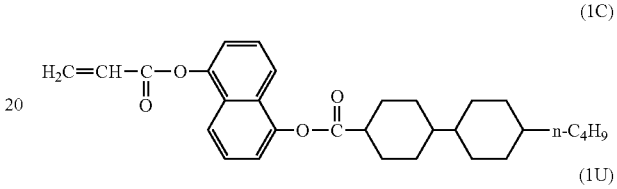
(1C)

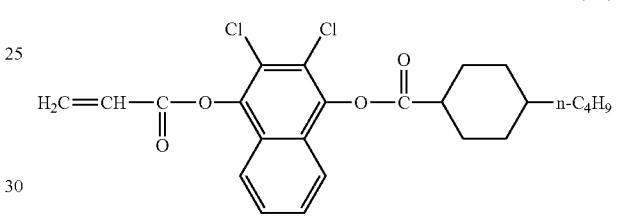
(1U)

Hereinafter, explanation is made under the assumption that emitted laser beam has three different wavelengths. However, it is a matter of course that a laser beam to be used in the optical head device of the present invention is not limited thereto, but the laser beam may have four or more wavelengths. Further, with respect to typical combination of retardation values of two phase plates (they are referred to as "first and second phase plates") constituting the broadband phase plate 90, the following may be mentioned. Here, when a laser beam is incident into the phase plates integrally laminated, retardation values of the phase plates incident firstly and secondly, namely the first and second phase plates, are designated as R1 and R2 respectively. Further, three different wavelengths of the laser beam are designated as $\lambda_1$, $\lambda_2$ and $\lambda_3$ respectively from shorter wavelength, and for example, a retardation value produced when light of wavelength $\lambda_1$ is incident into the first phase plate is designated as $R_1(\lambda_1)$, a retardation value generated when light of wavelength $\lambda_2$ is incident into the second phase plate is designated as $R_2(\lambda_2)$ and so on.

Here, at least one, preferably both, of the first and second phase plates have such retardation values R that the ratio of the retardation values of the respective wavelengths satisfy the above-mentioned formula (1), namely, the ratios $R(\lambda_1)/R(\lambda_3)$ and $R(\lambda_2)/R(\lambda_3)$ are each smaller than 1, $R(\lambda_1)/R(\lambda_3)$ is smaller than $R(\lambda_2)/R(\lambda_3)$. Accordingly, by optimizing retardation values R of the phase plate(s) and crossing angle of optical axes of the two phase plates to be laminated, the above-mentioned effect, namely, an effect of transforming linearly polarized light into substantially circularly polarized light, can be obtained.

Further, at least one, preferably both of the first and second phase plates have such retardation values that the ratio of the retardation values $R(\lambda_3)$ and $R(\lambda_1)$, namely, $\langle R(\lambda_1)/R(\lambda_3)\rangle$ is larger than the ratio of wavelength ($\lambda_1/\lambda_3$), and the ratio of retardation values $R(\lambda_3)$ and $R(\lambda_2)$, namely, $\langle R(\lambda_3)/R(\lambda_3)\rangle$ is larger than the ratio of wavelengths ($\lambda_2/\lambda_3$), and further, the ratio of retardation values $R(\lambda_2)$ and $R(\lambda_1)$, namely, $\langle R(\lambda_1)/R(\lambda_2)\rangle$ is larger than the ratio of wavelength ($\lambda_1/\lambda_2$), namely, the condition of formula (3) is satisfied, whereby the above-mentioned effect is further increased and it is possible to transform linearly polarized light into substantially complete circularly polarized light.

$$\langle R(\lambda_1)/R(\lambda_3)\rangle > (\lambda_1/\lambda_3)$$

$$\langle R(\lambda_2)/R(\lambda_3)\rangle > (\lambda_2/\lambda_3)$$

$$\langle R(\lambda_1)/R(\lambda_2)\rangle > (\lambda_1/\lambda_2) \qquad (3)$$

Large-small relationship of the ratio of retardation values and the ratio of wavelengths represented by the formula (3), is equivalent to such a relation that as wavelength increases from $\lambda_1$, $\lambda_2$ to $\lambda_3$, the ratio of retardation values decreases from $R(\lambda_1)/\lambda_1$, $R(\lambda_2)/\lambda_2$ to $R(\lambda_3)/\lambda_3$. This means that retardation values per unit wavelength decreases as wavelength increases.

This is apparent from the process of leading out formula (3). Namely, formula (4) defining conditions that the rate of change of retardation value is smaller than the rate of change of wavelength, is modified to lead out formula (3).

$$\langle R(\lambda_3)/R(\lambda_1)\rangle < (\lambda_3/\lambda_1),$$

$$\langle R(\lambda_3)/R(\lambda_2)\rangle < (\lambda_3/\lambda_2),$$

$$\langle R(\lambda_2)/R(\lambda_1)\rangle < (\lambda_2/\lambda_1) \qquad (4)$$

Formula (3) defines a condition that, in addition to the condition of formula (1), retardation value decreases (or increases) more slowly than the ratio of reduction (or increase) of wavelengths. Namely, in addition to the effect represented by formula (1), since retardation value at each wavelength changes more slowly, change of retardation value becomes smaller than the rate of change of incident wavelength, and such a characteristic provides an effect that the ratio of retardation value does not change rapidly in broadband region.

Moreover, by configuring the phase plates so that the retardation value $R_1$ (a retardation value produced by the first phase plate) at each wavelength is about ½ times the wavelength, the retardation value $R_2$ (a retardation value produced by the second phase plate) at each wavelength is about ¼, and the ratio $R_1/R_2$ between these retardation values is from 1.8 to 2.2, it is possible to constitute a broadband quarter wavelength plate which can transform linearly polarized light into circularly polarized light in entire region of from $\lambda_1$ to $\lambda_3$. Further, the configuration may also be such that the retardation value $R_1$ at each wavelength is about 9/2 times of the wavelength, the retardation value $R_2$ at each wavelength is about 9/4 times, and the ratio $R_1/R_2$ between these retardation values is from 1.8 to 2.2. Also in this case, it is possible to constitute a broadband quarter wavelength plate.

Figure 11:
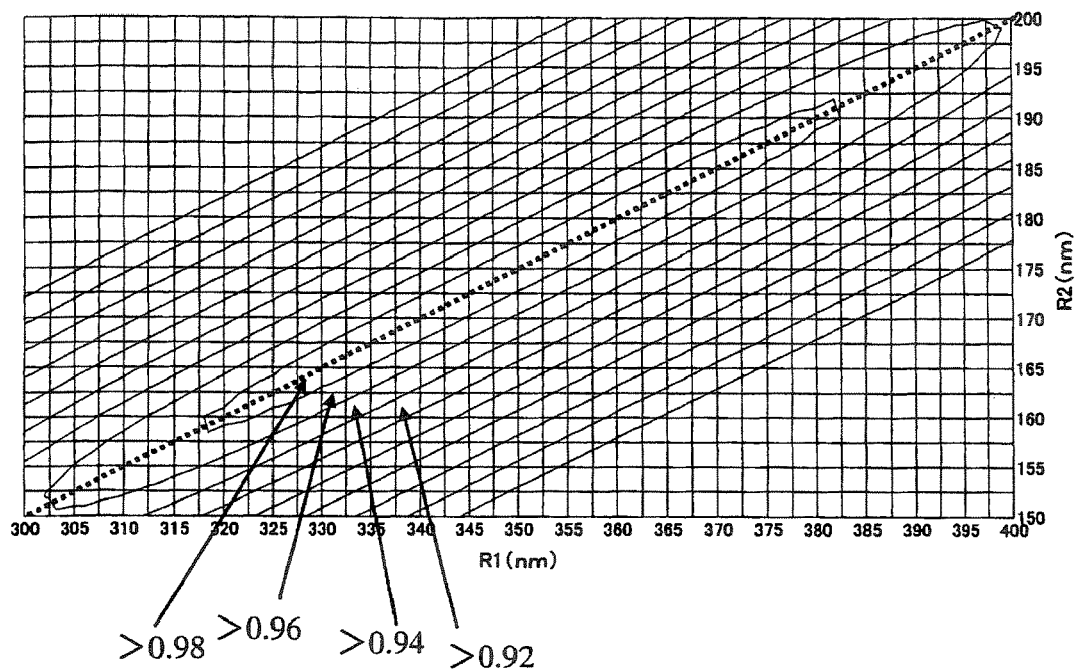
FIG. 11: A graph two-dimensionally showing change of ellipticity angle within a range of $R_1/R_2$=1.8 to 2.2.
Figure 12:
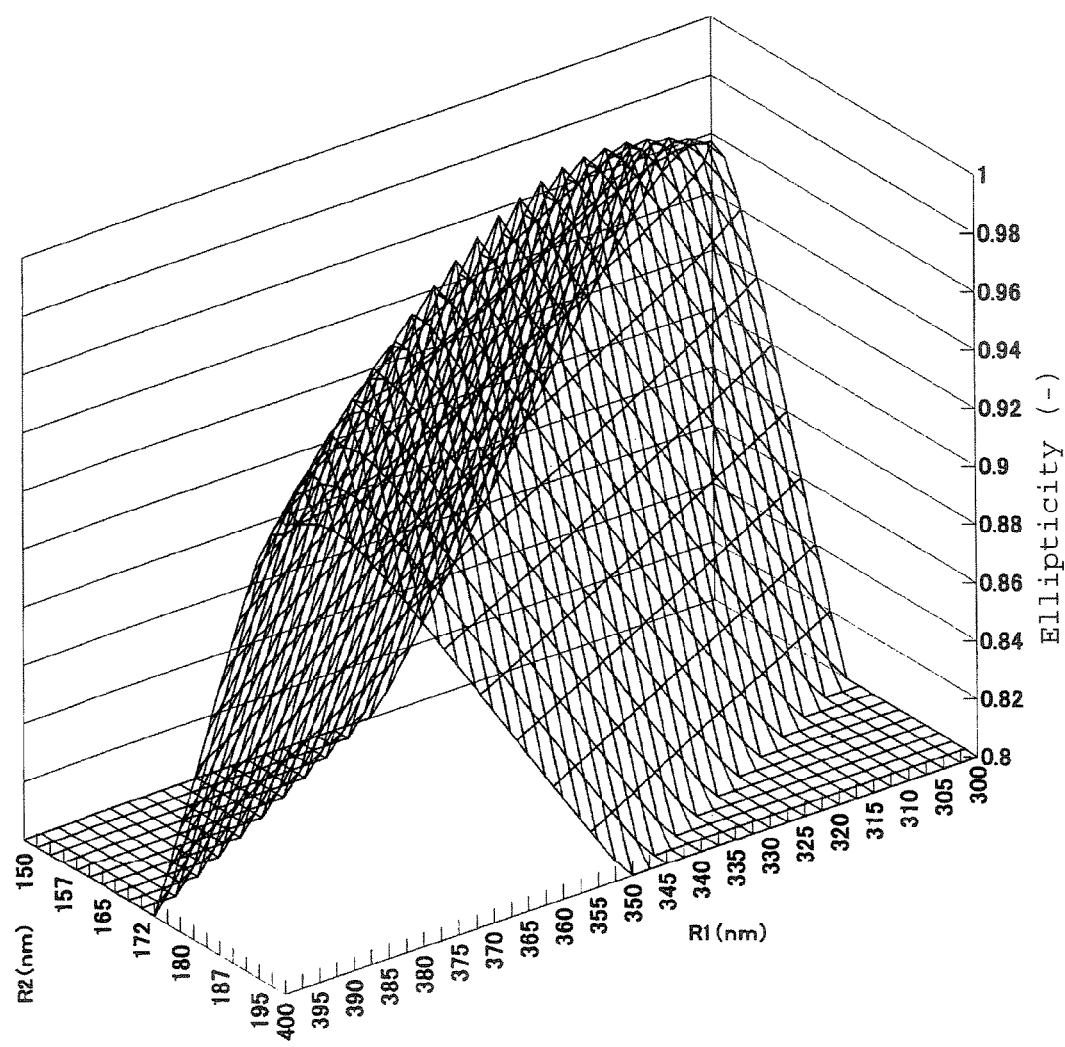
FIG. 12: A graph three-dimensionally showing FIG. 11.

The relation of $R_1/R_2$=18 to 2.2, is further described. The graph of FIG. 11 two dimensionally shows change of ellipticity angle when $R_1$ and $R_2$ satisfy $R_1/R_2$=18 to 2.2, and the graph of FIG. 12 three-dimensionally shows the same change (wavelength is 695 nm).

In the graph of two-dimensional showing, the lowest line of the lower group of lines under the dotted line ($R_1/R_2$=2) shows a case of $R_1/R_2$=about 2.2, and the highest line of the upper group of lines above the border shows a case of $R_1/R_2$=about 1.8.

Here, it is known that the highest line and the lowest line are border lines at which the ellipticity is about 0.8. Accordingly, in the region of $R_1/R_2$=1.8 to 2.2, ellipticity is at least about 0.8, and particularly in the case of $R_1/R_2$=2.0, the ellipticity becomes the maximum value of 1.0 or a value extremely close to 1.0. If the ellipticity is at least 0.8, the phase plate practically functions as a quarter wavelength plate, and if the ellipticity is at least 0.9, the phase plate becomes a further preferred quarter wavelength plate. Further, by observing three-dimensional graph, this nature is more easily understandable. Here, in the graph of FIG. 12, regions in which the ellipticity is smaller than 0.8 is also depicted to have an ellipticity of 0.8 so as to be more easily understandable.

Here, ellipticity is represented by $I_b/I_a$ provided that long axis intensity of transmission elliptically polarized light is Ia and its short axis intensity is Ib. Ellipticity of 1 corresponds to complete circularly polarized light.

The thicknesses of two phase plates of the present invention, are preferably within a range of from 2 to 10 μm considering transmission efficiency of light or problems of manufacturing process, and birefringent index Δn of birefringent materials to be used is preferably within a range of 0.01 to 0.2 at a wavelength 589 nm since the phase difference can be optionally selected in that region.

For lamination of two phase plates of the present invention, an adhesive film or an adhesive agent of UV curable type or thermosetting type may be used. In order to reduce wavefront aberration of broadband phase plate or to improve temperature properties or reliability of the broadband phase plate, an adhesive layer for the lamination is preferably as thin as possible, and in particular, the thickness of the adhesive layer is preferably at most 10 μm. Further, crossing angle of optical axes of the first and second phase plates in the lamination, is preferably within the range of from 40 to 70° since it is possible to make ellipticity a large value, namely, at least 0.8 in a wide wavelength region of from 400 nm to about 790 nm. However, it is sufficient that the phase plates are laminated at an optimized crossing angle of their optical axes, and not particularly restricted.

If the ellipticity is a large value close to 1.0, linearly polarized light transformed into circularly polarized light, becomes close to complete circularly polarized light. In the above-mentioned FIG. 11, calculation is made with respect to a case where the crossing angle of optical axes is 60° and wavelength of incident light is 695 nm, in which, for example, on the dot line ($R_1/R_2$=2) the ellipticity is approximately 1.0 and the phase plate functions as a substantially complete quarter wavelength plate.

The above-mentioned crossing angle of 60° between optical axes means that angles $\theta_1$ and $\theta_2$ of optical axis directions of the first and second phase plates constituting the broadband phase plate to polarization direction of linearly polarized light incident into the broadband phase plate, are, for example, $\theta_1$=75° and $\theta_2$=15° respectively. In the present invention, three wavelengths $\lambda_1$, $\lambda_2$ and $\lambda_3$ are used, and it is possible to make the ellipticity extremely close to 1.0 at two wavelengths, e.g. $\lambda_1$ and $\lambda_2$, among these three wavelengths. Here, ellipticity has two peaks at these two wavelengths, and at wavelength $\lambda_3$, a peak is not formed but a value close to 1.0 is obtained as a result. Here, the same result can be obtained also when the phase plate is configured so that $\theta_1$=15° and $\theta_2$=75°.

The method for designing the phase plate so as to obtain peaks at two wavelengths $\lambda_1$ and $\lambda_2$, is described is below.

Now, for example, the phase plate is configured so that $\theta_1$=75° and $\theta_2$=15°. At this time, the angle between two optical axes is 60°.

Angles a° deviated from these angles are defined as $\theta_1$=75−a° and $\theta_2$=15+a°.

Figure 13:
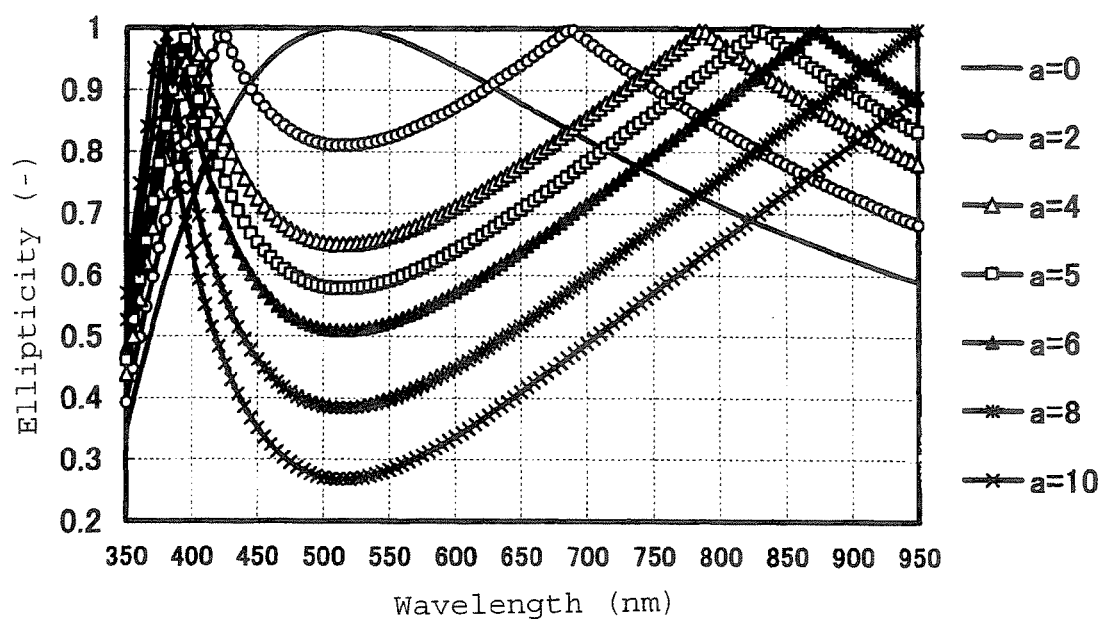
FIG. 13: A graph in which the distance between two is peak wavelengths at which ellipticity angle becomes 90°, is changed by changing a value of (a) provided that $\theta_1$=75−a° and $\theta_2$=15+a° and crossing angle of optical axes is approximately 60°.
Figure 14:
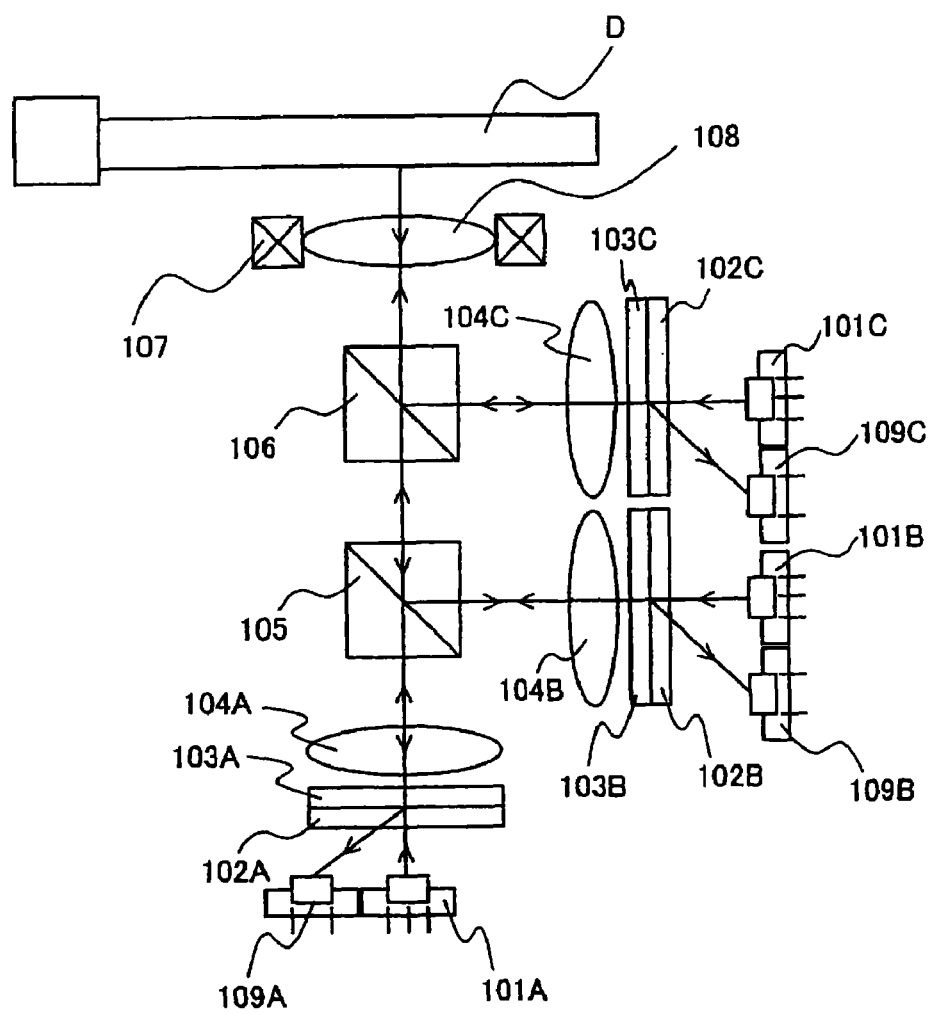
FIG. 14: A construction view showing a conventional optical head device.

FIG. 13 shows a graph in which the distance between two peak wavelengths at which the ellipticity becomes 1.0 is changed by changing the value (a) under the condition that $\theta_1=75-a°$, $\theta_2=15+a°$ and the crossing angle of optical axes is approximately 60°. FIG. 13 shows a nature that the positions of two peaks of wavelengths $\lambda_1$ and $\lambda_2$ changes as the value (a) changes from 2 to 10 starting from the position of peak wavelength 515 nm at a=0 under the condition that $R_1/R_2=2$. Accordingly, by appropriately changing the value (a), it is possible to optionally design the positions of peak wavelengths while maintaining ellipticities at two wavelengths $\lambda_1$ and $\lambda_2$ close to 1.0. At this time, the ellipticity at the third wavelength $\lambda_3$ can be a large value as described above.

This design concept can also be used in a design of broadband phase plate of Examples of the present invention. Here, in the above, the design is made so that the peaks are at the wavelengths $\lambda_1$ and $\lambda_2$, but the positions of the peaks may be at wavelengths $\lambda_1$ and $\lambda_3$, or may be at wavelengths $\lambda_2$ and $\lambda_3$. Here, FIG. 13 depicts a case of ordinary dispersion property in order to explain the characteristic as a general case.

At a time of using the broadband phase plate of the present invention, in order to avoid deterioration of wavefront aberration of transmission light, it is preferred to carry out smoothing treatment of surfaces and to bond the phase plate to a substrate for holding. Specifically, it is preferred to bond the broadband phase plate to at least one transparent substrate. In a case where the broadband phase plate is used alone without being laminated and integrated with other optical elements, a construction of sandwiching the broadband phase plate by two transparent substrates is preferred from the viewpoint of reducing wavefront aberration and maintaining strength.

The broadband phase plate of the present invention can be used alone, but if it is laminated and integrated with other optical elements to be used for optical head device, it is possible to reduce the number of components to simplify assembly of an optical head device and to realize downsizing of the device. Accordingly, it is preferred that the broadband phase plate is integrated with at least one optical element for changing optical characteristics of laser beam.

Specifically, the optical element may, for example, be a phase correction element employing a liquid crystal for improving convergent property on an optical disk, a diffraction grating for leading signal light to detector by diffraction, or in particular, a polarizing diffraction grating using the difference of diffraction properties in different polarization directions. The broadband phase plate according to the present invention exhibits particularly significant effects when it is employed in an optical head device having an optical element using the difference of characteristics in different polarization directions, and the broadband phase plate is suitable as a component for an optical head device to be used for writing/reading an optical information which requires further small size and light weight.

Then, the effect of this embodiment is described with reference to FIG. 1.

Laser beams emitted from a laser diode 1A of wavelength 405 nm, a laser diode 1B of wavelength 660 nm and a laser diode 1C of wavelength 790 nm, are transformed into parallel beams by collimator lenses 2A to 2C, transmitted through a beam splitter 3, a beam splitter 4, a polarizing hologram 8 and a quarter wavelength plate 9, and converged on an optical disk D by an objective lens 6.

Meanwhile, reflected light beams reflected by pits formed on a surface of an optical disk D and including information of the pits, propagates inversely through the respective paths. The returning light beams from the optical disk D transmitted through or reflected by the beam splitter 4 and the beam splitter 3, are transmitted through the respective collimator lenses 2A to 2C, and detected by a photodiode 7A for 405 nm, a photodiode 7B for 660 nm, and a photodiode 7C for 790 nm respectively.

In the construction of the optical head device shown in FIG. 1, a polarizing hologram optimized for a laser beam of any one of the three wavelengths, or a polarizing hologram optimized for 405 nm and 660 nm, is employed as the polarizing hologram 8. The polarizing hologram 8 shows, at all of these wavelengths, high transmittance in the outgoing path and only insignificant lowering of efficiency in the returning path.

EXAMPLES

Example 1

This Example is described with reference to FIG. 2.

Figure 2:
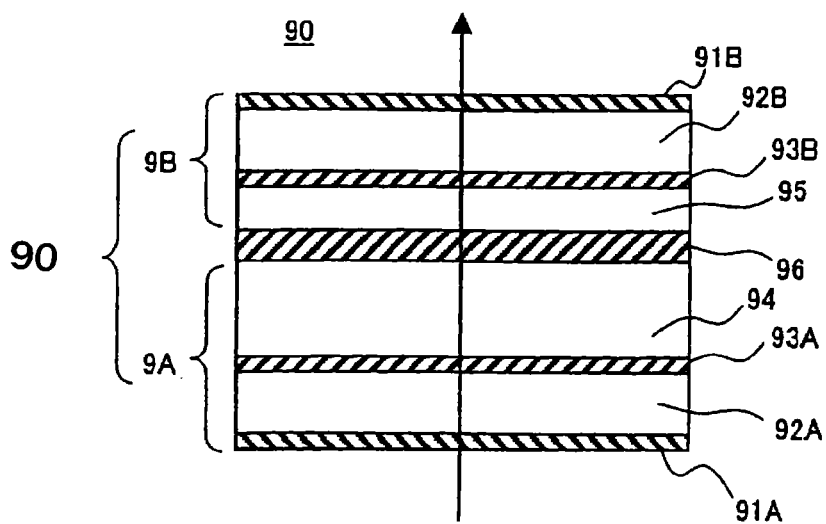
FIG. 2: A schematic cross-sectional view showing the construction of a broadband phase plate according to an embodiment of the present invention.

As shown in FIG. 2, a broadband phase plate 90 of this Example is constituted by first and second phase plates 9A and 9B that are integrated together.

Specifically, a glass substrate 92A is prepared which is a transparent substrate having a diameter of 12.5 cm and a thickness of 0.5 mm whose one of surfaces (lower surface in the Figure) in which laser beams are incident is provided with a low reflective coating film 91A. On a surface of the glass substrate 92A (upper surface in the Figure) opposite from the light source 1 (refer to FIG. 1), a polyimide film is formed and applied with horizontal alignment treatment by rubbing to form a polyimide film 93A. On the glass substrate 92A applied with the alignment treatment, $SiO_2$ beads (not shown) of 6.6 μm in diameter is dispersed at a density of 5,000 pieces/cm² in order to maintain a gap between the substrate and a surface of a glass substrate 92B being a transparent substrate to be described later to constitute a liquid crystal cell. Thereafter, a glass substrate provided with horizontal alignment, not shown, on which a mold-separation agent (not shown) is applied, and the glass substrate 92A applied with the above alignment treatment, are disposed so as to be opposed to each other, and using an epoxy seal agent (not shown) of thermosetting type printed in a peripheral portion of the glass substrate 92A, the gap between the two glass substrates is maintained to be 6.6 μm.

In the gap, a liquid crystal monomer having extraordinary dispersion property is injected by using a vacuum, so that the liquid crystal monomer is sandwiched between two glass substrates, namely, between the glass substrate 92A and the glass substrate applied with horizontal alignment, not shown. At this time, 1% of photo-polymerization initiator is mixed into the liquid crystal monomer to form a UV-curable liquid crystal monomer composition.

Thereafter, entire liquid crystal material is irradiated with UV light of wavelength 365 nm so that the entire liquid crystal monomer composition is polymerized and solidified as it is in the state of horizontal alignment, to solidify entire construction constituted by the glass substrates. Then, after a heat treatment of 140° C. for 30 minutes, the opposed glass substrates applied with horizontal alignment (not shown) is removed by separation treatment, so as to produce a phase plate 9A on which an organic thin film of a polymer liquid crystal thin film 94 of 6.6 μm thick applied with horizontal alignment.

Further, in the same manner, using the same UV-curable liquid crystal monomer composition, a phase plate 9B is produced, which is provided with an organic thin film of polymer liquid crystal thin film 95 of 3.3 μm thick and applied with horizontal alignment.

Figure 3:
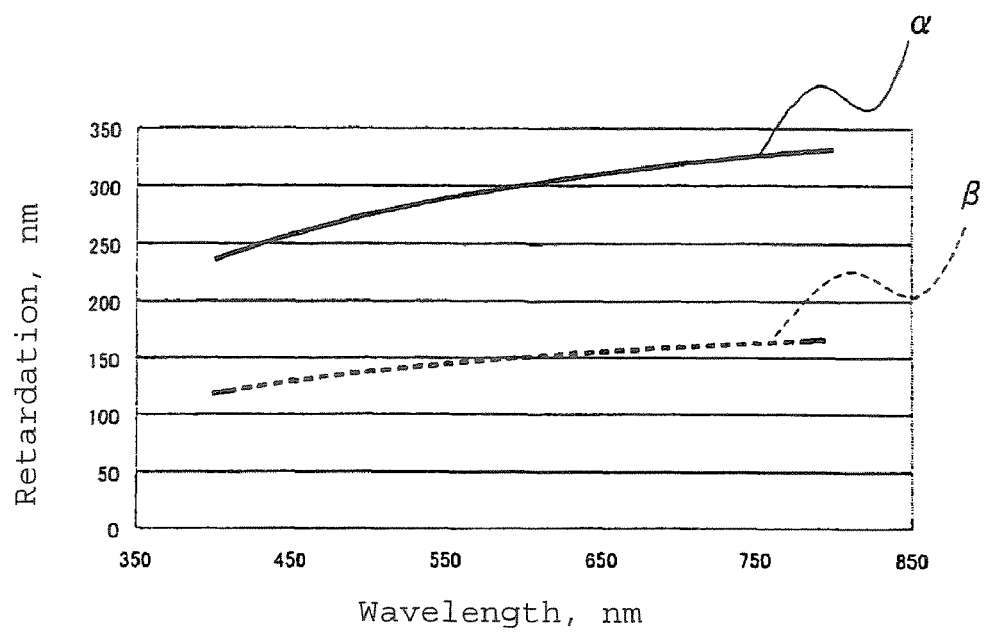
FIG. 3: A graph showing wavelength dependence of retardation value of the broadband phase plate of the present invention shown in FIG. 2 for transmission light.

At this time, when the retardation values of the first phase plate 9A and the second phase plate 9B are measured, it is expected to obtain extraordinary dispersion property in which the retardation value decreases as the wavelength becomes shorter as shown in FIG. 3, and the ratio of retardation values between the first phase plate 9A and the second phase plate 9B is approximately 2 in the wavelength band of from 400 to 800 nm. The birefringence of the organic thin film at this time, is 0.0361 at a wavelength 405 nm, 0.0473 at a wavelength 660 nm and 0.05 at a wavelength 790 nm. Here, in FIG. 3, α indicates the retardation value of the first phase plate 9A at each wavelength, and β indicates the retardation value of the second phase plate 9A at each wavelength.

When $R(\lambda)/\lambda$ at each wavelength is calculated, the ratio of the values at wavelengths 405 nm, 660 nm and 790 nm becomes 8.91:7.17:6.33, which indicates that the value decreases as wavelength increases. Namely, this indicates that the rate of increase of retardation value is smaller than the rate of increase of wavelength.

Subsequently, the first phase plate 9A and the second phase plate 9B are disposed so that their surfaces having organic thin films are opposed to each other, a UV-curable adhesive agent is dripped between these substrates, they are mounted on a spin coating apparatus and rotated at a rotation speed of 1,000 rpm for 20 seconds and at a rotation speed of 5,000 rpm for 100 seconds, to form an adhesive layer 96 of 5 µm thick. In this step, the first phase plate 9A and the second phase plate 9B are disposed so that the crossing angle of their optical axes becomes 57°.

Thereafter, the adhesive layer 96 is irradiated with UV light of 5,000 mJ to be cured to form a broadband phase plate. Using a direction of −20° (horizontal direction in the document face is designated as 0°) to the optical axis of the phase plate 9A as a reference, the broadband phase plate 90 is cut into pieces of 5 mm×5 mm by a dicing saw to obtain broadband phase plate elements.

Then ellipticity of the broadband phase plate 90 is measured by using a laser beam of wavelength 430 nm being a second harmonic wave generated by using a non-linear optical crystal $KNbO_3$ and using an emission light beam from a laser diode of wavelength 860 nm as a fundamental wave, an emission light beam from a laser diode of wavelength 660 nm and an emission light beam of a laser diode of wavelength 789 nm.

The ellipticity to be measured is about 0.96 for laser beam of wavelength 430 nm, about 0.97 for laser beam of wavelength 660 nm and about 0.97 for laser beam of wavelength 789 nm, which are sufficient properties for practical use.

Figure 4:
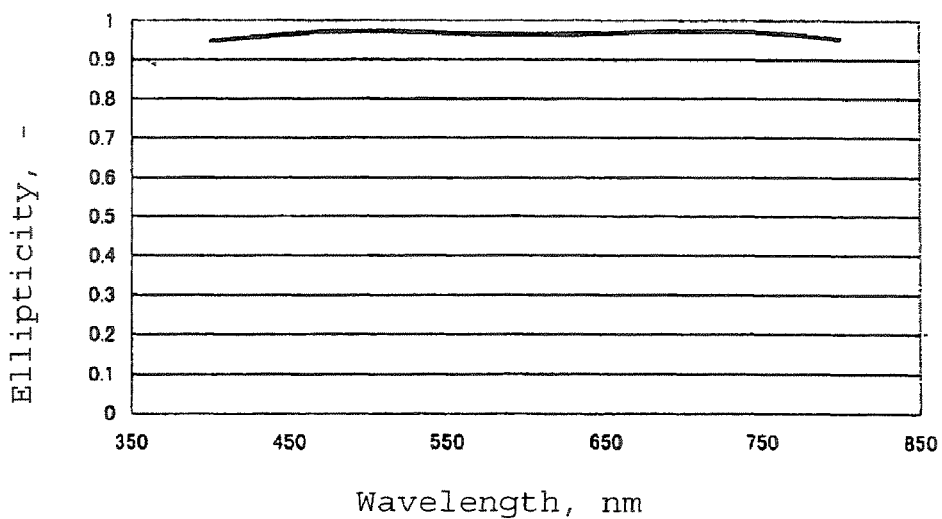
FIG. 4: A graph showing wavelength dependence of ellipticity of the broadband phase plate in the present invention for transmission light.

In the same manner, when wavelength dispersion of ellipticity in other wavelength regions is measured, as shown in FIG. 4, it is understandable that the broadband phase plate function as a quarter wavelength plate in substantially entire wavelength region. Further, wavefront aberration of the broadband phase plate 90 of this Example is at most 25 m λrms (root mean square) when it is measured by using a He—Ne laser of wavelength 633 nm, which is in a level sufficiently usable as an optical element. This broadband phase plate 90 is integrated in the optical head device shown in FIG. 1 as a quarter wavelength plate 9. Meanwhile, laser diodes of 405 nm, 660 nm and 790 nm are disposed as the light source 1. As a result, satisfactory circularly polarized light beams corresponding to three laser beams of wavelengths 405 nm, 660 nm and 790 nm, can be obtained, and signal light of high light-utilization efficiency can be obtained.

Comparative Example

Then, as a Comparative Example, a case of employing a birefringent material having ordinary dispersion property as the material for forming polymer liquid crystal, is described.

Figure 5:
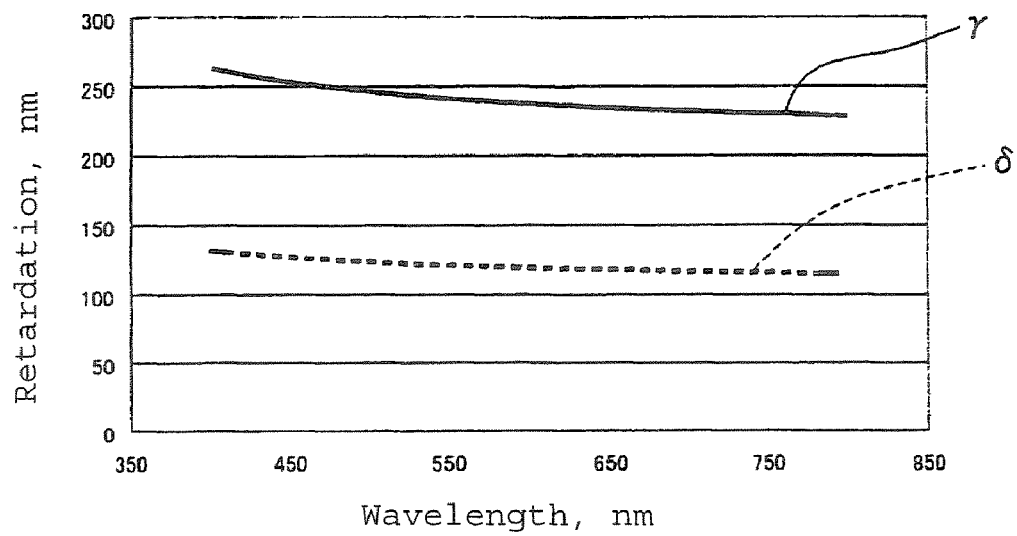
FIG. 5: A graph showing wavelength dependence of retardation value of a broadband phase plate of Comparative Example for transmission light.

As the birefringent material having ordinary dispersion property, a monomer for forming general side-chain type polymer liquid crystal, is employed. A broadband phase plate employing the liquid crystal monomer is prepared by a method equivalent to that of Example 1. Here, the thickness of the first phase plate in the light-incident side is 5.2 µm, the thickness of the second phase plate in the light-output side is 2.6 µm and these phase plates are disposed so that the crossing angle of their optical axes becomes 56°. The retardation values of the phase plates in the light-incident side and light-output side of the broadband phase plate, are such that as shown in graphs γ and δ of FIG. 5, as the wavelength is shorter, the retardation values become larger. Namely, it is understandable that the broadband phase plate has ordinary dispersion property. The birefringence of the organic thin film at this time, is 0.0508 at a wavelength 405 nm, 0.0453 at a wavelength 660 nm and 0.0443 at a wavelength 790 nm.

Figure 6:
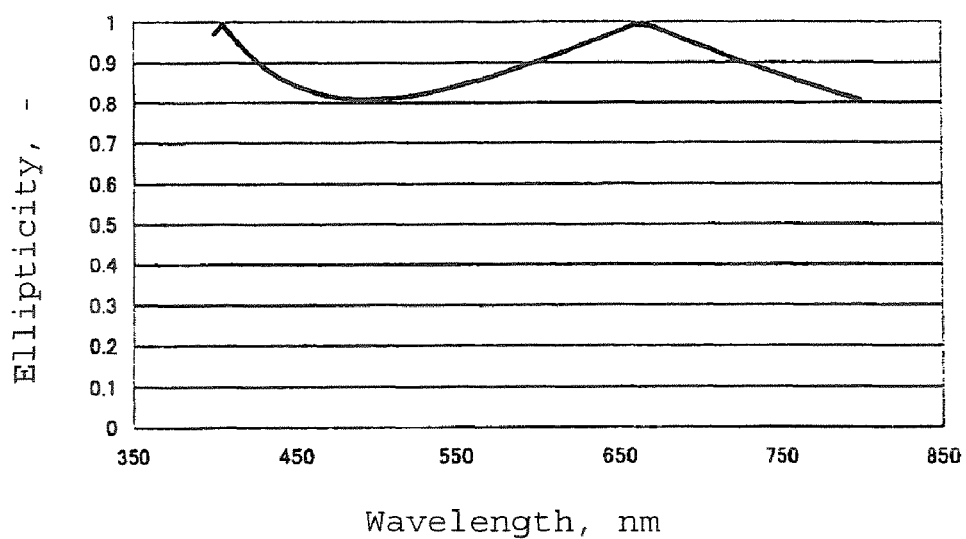
FIG. 6: A graph showing wavelength dependence of ellipticity of a broadband phase plate of Comparative Example for transmission light.

Then, using the broadband phase plate of this Comparative Example, wavelength dispersion of ellipticities at different wavelength regions are studied, and as a result, the wavelength dispersion of ellipticity was about 0.99 for laser beam of wavelength 430 nm, about 0.99 for laser beam of wavelength 660 nm and about 0.82 for laser beam of wavelength of 789 nm as shown in FIG. 6.

When FIG. 6 showing measurement result of ellipticity wavelength dispersion of this Comparative Example and FIG. 4 showing expected ellipticity wavelength dispersion of Example 1, are compared, it is evident that as compared with the graph of FIG. 6 of Comparative Example, the graph of FIG. 4 of Example 1 shows such a characteristic that the ellipticity is constant irrespective of wavelength, which shows a function of substantially complete quarter wavelength plate in a considerably broadband wavelength region. This result indicates that the broadband phase plate of this Example is more excellent as a broadband phase plate in an optical head device using a plurality of laser beams.

Example 2

In Example 2, a case of employing two types of liquid crystal monomers as materials having extraordinary dispersion property, is described.

As the two types of liquid crystal monomers, a liquid crystal monomer which produces an organic thin film having a birefringence of 0.0361 at a wavelength 405 nm, 0.0473 at a wavelength 660 nm and 0.0500 at a wavelength 790 nm, and a liquid crystal monomer which produces an organic thin film having a birefringence of 0.0194 at a wavelength 405 nm, 0.0239 at a wavelength 660 nm and 0.0250 at a wavelength 790 nm, are employed.

Figure 7:
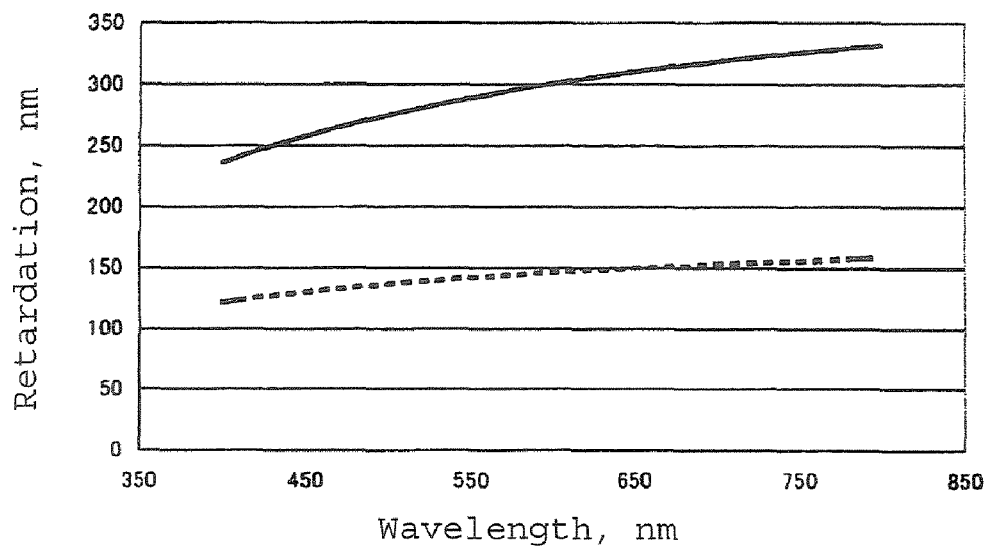
FIG. 7: A graph showing wavelength dependence of retardation value of the phase plate of Example 2 for transmission light.

By using these liquid crystal monomers, a broadband phase plate is produced by a method equivalent to that of Example 1. At this time, the thickness of the first phase plate in the light-incident side is 6.6 µm, the thickness of the second phase plate in the light-output side is 6.3 µm, and these phase plates are disposed so that the crossing angle of their optical axes becomes 61°. The retardation values of the first and second phase plates in the light-incident side and the light-output side in the broadband phase plate, become as shown in FIG. 7, which shows extraordinary dispersion property in which the retardation value in the light-output side becomes smaller as the wavelength becomes shorter.

Figure 8:
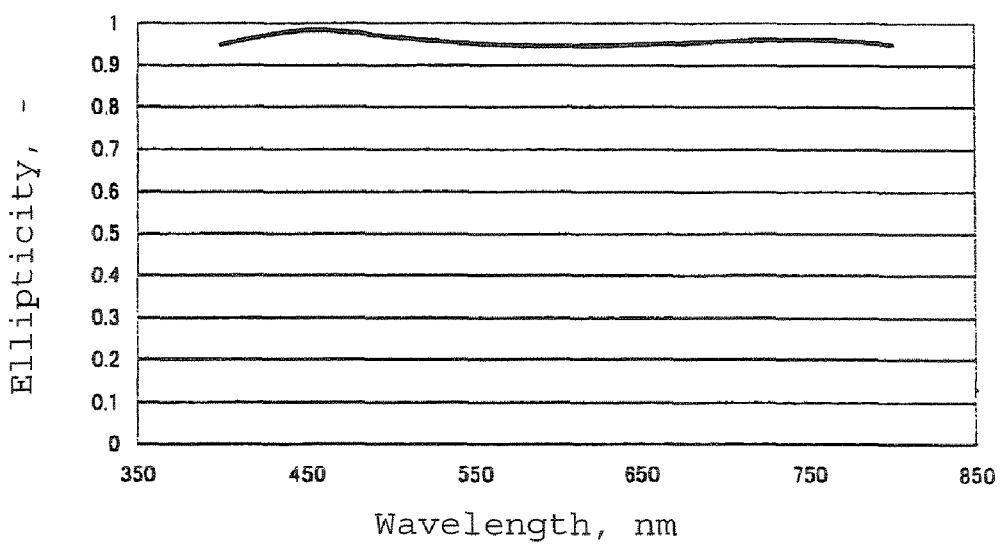
FIG. 8: A graph showing wavelength dependence of ellipticity of a broadband phase plate of Example 2 for transmission light.

Then, by using this broadband phase plate, wavelength dispersion of ellipticity in each wavelength region is studied, and as a result, the wavelength dispersion becomes as shown in FIG. 8, about 0.96 for a laser beam of wavelength 430 nm, about 0.96 for a laser beam of wavelength 660 nm and about 0.96 for a laser beam of wavelength 789 nm. When FIG. 8 and FIG. 4 showing expected ellipticity wavelength dispersion described in Example 1 are compared, it is understandable that these Figures show substantially similar wavelength dispersion properties. Further, it is evident that as compared with FIG. 6 of Comparative Example, FIG. 8 of Example 2 shows a characteristic that the ellipticity is constant irrespective of wavelength, and shows a function of substantially complete quarter wavelength plate in a considerably broadband wavelength region.

Example 3

The following compound (1A), the following compound (1B), the following compound (1C) and the following compound (1U) are mixed at a molar ratio of 6:8:6:5 to obtain a liquid crystal composition A. When an organic thin film was formed by using the liquid crystal composition A, the birefringent index was 0.0065 at wavelength 405 nm, 0.0105 at wavelength 660 nm and 0.0107 at wavelength 790 nm.

When R($\lambda$)/$\lambda$ at the wavelengths are calculated from these values, the ratio of those of wavelength 405 nm, 660 nm and 790 nm becomes 1.65:1.59:1.35, which shows that R($\lambda$)/$\lambda$ decreases as the wavelength increases. Namely, this shows that the increase rate of retardation value is smaller than the increase rate of wavelength.

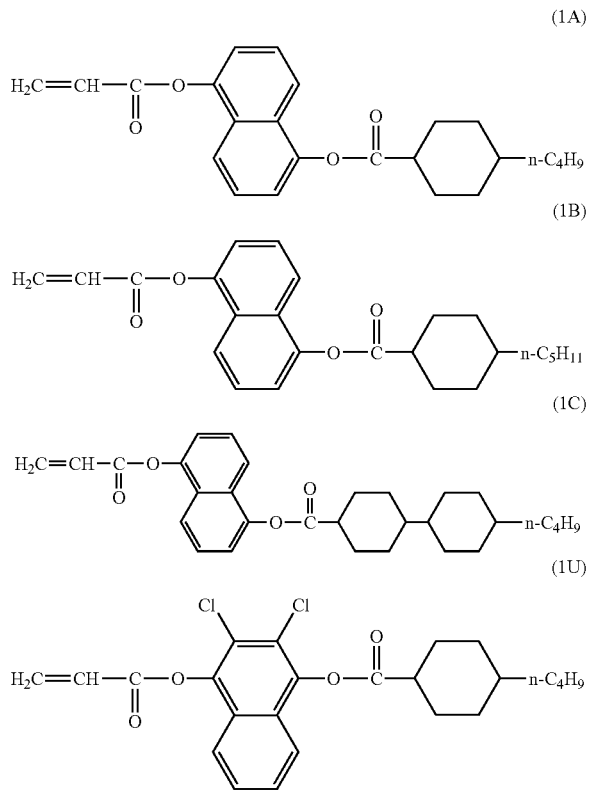

Figure 9:
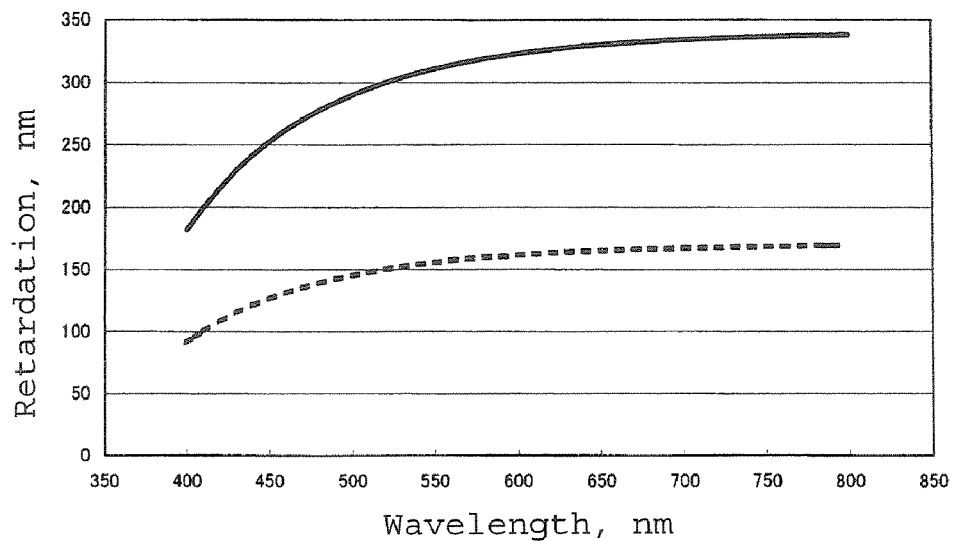
FIG. 9: A graph showing wavelength dependence of retardation value of a phase plate of Example 3 for transmission light.

By using this liquid crystal composition A, a broadband phase plate is produced by a method equivalent to that of Example 1. At this time, the thickness of the first phase plate in the light-incident side is 31.5 μm, the thickness of the second phase plate in the light-output side is 15.8 μm, and these phase plates are disposed so that the crossing angle of their optical axes becomes 59°. At this time, the retardation values of the first phase plate 9A and the second phase plate 9B were measured, and as a result, it was found that extraordinary dispersion property is obtained in which the retardation value becomes smaller as the wavelength becomes shorter as shown in FIG. 9 and the ratio of the retardation values of the first phase plate 9A and the second phase plate 9B is about 2 in a wavelength band of from 400 to 800 nm.

Figure 10:
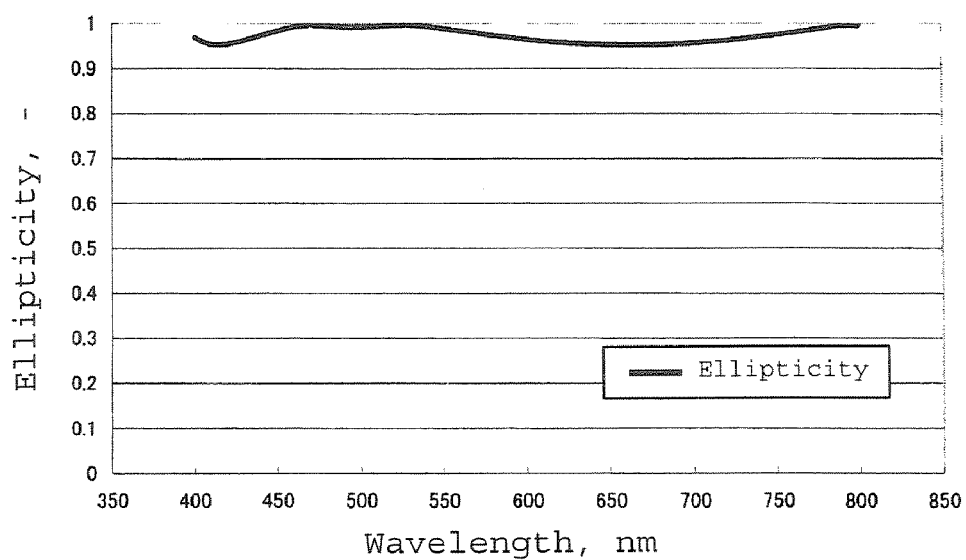
FIG. 10: A graph showing wavelength dependence of ellipticity of a broadband phase plate of Example 3 for transmission light.

Then using the broadband phase difference element, wavelength dispersion of ellipticity in each wavelength region is studied, and as a result, the wavelength dispersion was about 0.96 for a laser beam of wavelength 430 nm, about 0.95 for a laser beam of wavelength 660 nm and about 0.99 for a laser beam of wavelength 789 nm as shown in FIG. 10. When FIG. 10 and FIG. 4 showing measurement result of ellipticity wavelength dispersion described in Example 1, are compared, it is understandable that they show substantially similar wavelength dispersion characteristics. Further, it is evident that as compared with FIG. 6 of Comparative Example, FIG. 10 of Example 3 shows a characteristic that the ellipticity is constant irrespective of wavelength, and shows a function of substantially complete quarter wavelength plate in a considerably broadband wavelength band.

Here, the present invention is by no means limited to the above-mentioned embodiments, but it can be exploited in various embodiments within the range of not departing from the gist of the present invention. Namely, it is obvious that the present invention is applicable to not only broadband quarter wavelength plates but also to e.g. broadband half wavelength plates or broadband three-quarter wavelength plates. Further, it is possible to apply the present invention to various applications within the range not diminishing the effect of the present invention.

INDUSTRIAL APPLICABILITY

The optical head device of the present invention employs, differently from conventional optical head devices, a phase plate whose retardation value becomes smaller as wavelength becomes shorter, for at least one of two broadband phase plates laminated together. The phase plate substantially functions as a quarter wavelength plate for at least three linearly polarized laser beams of different wavelengths transmitted, and provides an effect of transforming these linearly polarized laser beams into circularly polarized laser beams. This feature enables to make an optical element common to each of the wavelengths to reduce the number of components, and realizes an optical head device requiring shorter assembly time, which is small sized and low cost.

Further, since the broadband phase plate of the present invention functions as a substantially complete quarter wavelength plate in entire wavelength band to be used, it is possible to transform linearly polarized light into circularly polarized light without any problem even if there is variation of wavelength of light emitted from a laser diode due to e.g. lot to lot variation.

The entire disclosure of Japanese Patent Application No. 2004-266728 filed on Sep. 14, 2004 including specification, claims, drawings and summary is incorporated herein by reference in its entirety.

What is claimed is:
1. An optical head device comprising a light source for emitting a linearly polarized laser beam, an objective lens for converging the laser beam to guide it to an optical recording medium, and a photodetector for receiving light reflected by the optical recording medium, wherein the laser beam includes three laser beams having wavelengths of $\lambda_1=405$ nm, $\lambda_2=660$ nm and $\lambda_8=790$ nm, a broadband phase plate for controlling phase state of the laser beam is disposed between the light source and the objective lens, the broadband phase plate is constituted by two phase plates laminated so that their optical axes are crossed, and when the three laser beams have wavelengths $\lambda_1$, $\lambda_2$ and $\lambda_3$ ($\lambda_1<\lambda_2<\lambda_3$) respectively, at least one of the phase plates has such retardation values that proportions $\langle R(\lambda_1)/R(\lambda_3)\rangle$ and $\langle R(\lambda_2)/R(\lambda_3)\rangle$ between retardation values $R(\lambda)$ at the wavelengths, satisfy the following formulas:

$\langle R(\lambda_1)/R(\lambda_3)\rangle<1$, $\langle R(\lambda_2)/R(\lambda_3)\rangle<1$, and $\langle R(\lambda_1)/R(\lambda_3)\rangle<\langle R(\lambda_2)/R(\lambda_3)\rangle$.

2. The optical head device according to claim 1, wherein the laser beam has any one of wavelengths $\lambda_1$, $\lambda_2$ and $\lambda_3$, and said at least one of the phase plates has retardation values satisfying the following relations:
the value of the proportion $\langle R(\lambda_1)/R(\lambda_3)\rangle$ between the retardation values $R(\lambda_3)$ and $R(\lambda_1)$ is larger than the ratio of wavelengths $(\lambda_1/\lambda_3)$,
the ratio $\langle R(\lambda_2)/R(\lambda_3)\rangle$ between the retardation values $R(\lambda_3)$ and $R(\lambda_2)$ is larger than the value of wavelengths $(\lambda_2/\lambda_3)$, and
the ratio $\langle R(\lambda_1)/R(\lambda_2)\rangle$ between the retardation values $R(\lambda_2)$ and $R(\lambda_1)$ is larger than the ratio of wavelengths $(\lambda_1/\lambda_2)$.

3. The optical head device according to claim 1, wherein among the two phase plates, the retardation value of the phase plate into which the laser beam is incident firstly is larger than the retardation value of the phase plate into which the laser beam is incident secondly, and the ratio of the two retardation values is from 1.8 to 2.2.

4. The optical head device according to claim 1, wherein the crossing angle of the optical axes of the two phase plates is within a range of from 40 to 70°.

5. The optical head device according to claim 1, wherein the broadband phase plate has substantially the same ellipticities in the three wavelength regions where the laser beams of three wavelengths are transmitted.

6. The optical head device according to claim 1, wherein the two phase plates are laminated via an adhesive layer and the thickness of the adhesive layer is at most 10 μM.

7. The optical head device according to claim 1, wherein the two phase plates are employed as they are bonded to at least one transparent substrate.

8. An optical head device according to claim 1, wherein the broadband phase plate is integrated with at least one optical element for changing optical characteristics of the laser beam.

9. The optical head device according to claim 1, wherein the retardation value decreases as wavelength increases in the region from 400 to 800 nm.

10. The optical head device according to claim 1, wherein the rate of increase of the retardation value is smaller than the rate of increase of the wavelength in the region from 400 to 800 nm.

11. The optical head device according to claim 1, wherein the broadband phase plate includes a polyimide film applied with a horizontal alignment treatment.

12. The optical head device according to claim 1, wherein the broadband phase plate comprises two glass substrates between which is sandwiched a polymer liquid crystal thin film comprising a cured liquid crystal monomer.

13. The optical head device according to claim 1, wherein the broadband phase plate comprises a first phase plate and a second phase plate, and wherein the ratio of the retardation values of the first phase plate and the second phase plate is approximately 2.

14. The optical head device according to claim 1, wherein the broadband phase plate has an ellipticity of 0.96-1.0 in the range from 400 to 800 nm.

15. The optical head device according to claim 1, wherein the broadband phase plate has an ellipticity of at least 0.9 in the range from 400 to 800 nm.

16. The optical head device according to claim 1, wherein the broadband phase plate comprises a first glass substrate and a second glass substrate, wherein the first glass substrate and the second glass substrate sandwich a polymer liquid crystal thin film comprising a cured mixture of at least two different liquid crystal monomers.

17. The optical head device according to claim 16, wherein the liquid crystal monomers produce a polymer liquid crystal thin film having a birefringence of from 0.0065 to 0.031 at a wavelength of 405 nm.

18. The optical head device according to claim 1, wherein the broadband phase plate comprises a first transparent plate and a second transparent plate, wherein the first and second transparent plates sandwich a dispersion layer comprising cured units of at least one liquid crystal monomer selected from the group consisting of:

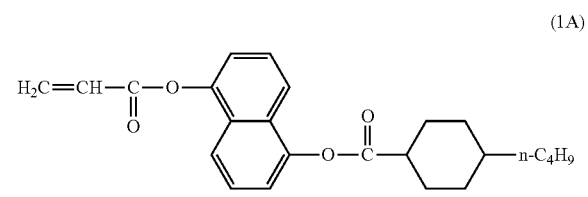
(1A)

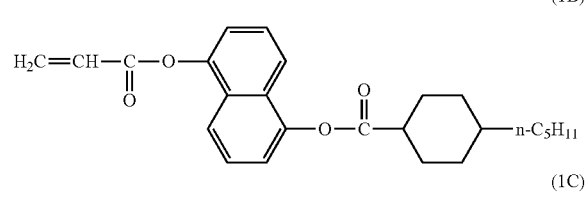
(1B)

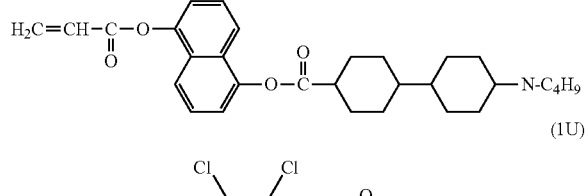
(1C)

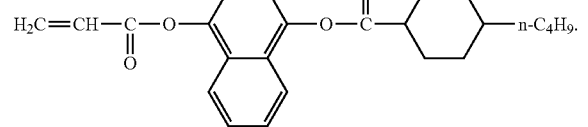
(1U)

19. The optical head device according claim 1, wherein the broadband phase plate comprises a polymeric liquid crystal comprising polymerized units of a liquid crystal monomer composition.

20. The optical head device according to claim 3, wherein the broadband phase plate has an ellipticity of at least 0.8 at a wavelength of 695 nm.

21. The optical head device according to claim 20, wherein the broadband phase plate has an ellipticity of at least 0.9 at a wavelength of 695 nm.

22. The optical head device according to claim 4, wherein the broadband phase plate has an ellipticity of at least 0.8 within a wavelength range of from 400 nm to 790 nm.

23. The optical head device according to claim 2, wherein the ratio of the value $R(\lambda)/\lambda$ at wavelengths of 405 nm, 660 nm and 790 nm is 8.91:7:71:6.33 or 1.65:1.59:1.35.

* * * * *